United States Patent [19]

Bornslaeger

[11] 4,374,888
[45] Feb. 22, 1983

[54] NONWOVEN LAMINATE FOR RECREATION FABRIC

[75] Inventor: Stephan R. Bornslaeger, Outagamie County, Wis.

[73] Assignee: Kimberly-Clark Corporation, Neenah, Wis.

[21] Appl. No.: 305,575

[22] Filed: Sep. 25, 1981

[51] Int. Cl.$^3$ ............................................. B32B 27/14
[52] U.S. Cl. ..................................... 428/198; 428/204; 428/207; 428/218; 428/219; 428/284; 428/286; 428/296; 428/903; 428/913; 428/920
[58] Field of Search .............. 428/198, 204, 206, 219, 428/283, 284, 286, 903, 913, 920, 919, 296, 218, 207

[56] References Cited

U.S. PATENT DOCUMENTS

| | | | |
|---|---|---|---|
| 3,932,682 | 1/1976 | Loft et al. | 428/296 |
| 4,041,203 | 8/1977 | Brock et al. | 428/296 |
| 4,194,041 | 3/1980 | Gore et al. | 428/315 |
| 4,196,245 | 4/1980 | Kitson et al. | 428/284 |
| 4,217,386 | 8/1980 | Arons et al. | 428/296 |

*Primary Examiner*—James J. Bell

*Attorney, Agent, or Firm*—William D. Herrick; Wendell Fredericks; Howard Olevsky

[57] ABSTRACT

Laminate of nonwoven fabric having unique properties suitable especially for use as a recreational fabric in the manufacture of tents, outer garments, tarpaulins and the like. The laminate includes, as essential components, an outer spunbonded layer treated for resistance to ultraviolet radiation and intended as the exposure surface, an inner microporous meltblown layer, preferably densified for resistance to liquid strike-through, and, on the unexposed surface, another nonwoven layer treated for flame retardancy. The combination optionally includes additional pigments in the exposed surface layers for desired appearance as well as pigments and/or ultraviolet radiation resistance treatment in the inner meltblown layer. As additional options, further layers of meltblown or spunbonded nonwovens may be included to attain desired physical properties. The resulting material provides a unique combination having excellent properties for recreational fabric uses, especially water repellency, breathability, resistance to degradation by ultraviolet radiation and flame retardancy.

8 Claims, 5 Drawing Figures

NONWOVEN LAMINATE FOR RECREATION FABRIC

BACKGROUND OF THE INVENTION

1. Field of the Invention

The present invention is directed to improvements in nonwoven fabric materials, especially those useful for manufacture of recreational products such as tents, outer wear, tarpaulins and the like. While nonwoven fabrics designed for such purposes have been available, their use has, in general, involved a decision between expensive, sophisticated laminates and simple single layer materials of rather limited utility. Reasons for the rather unsatisfactory choice include the demanding requirements for such a fabric which must be resistant to the passage of water, breathable, and flame retardant while also resistant to degradation by ultraviolet radiation. While much effort has been directed to achieving an optimum combination of these properties in a base material, the results to date have not been entirely satisfactory. For example, it has been found in many cases that treatments for flame retardancy and resistance to degradation by ultraviolet radiation detrimentally affect each other with the result that a compromise in these properties is necessary. In addition, it is desirable to provide such materials on a more economic basis while retaining beneficial properties. Therefore, the need persists for an improved nonwoven fabric especially intended for recreational uses.

2. Description of the Prior Art

Representative of prior art materials described generally above include those disclosed in U.S. Pat. No. 4,194,041 to Gore et al. dated Mar. 18, 1980. These laminates include a combination of a hydrophilic interior interfacing layer and a hydrophobic outer layer. Examples of the former include perfluorosulfonic ion exchange membranes and an example of the latter is polytetrafluoroethylene sheeting. Such materials are relatively costly, and the patent contains no disclosure of ultraviolet radiation degradation or flame retardancy results. U.S. Pat. No. 4,041,203 to Brock et al. issued Aug. 9, 1977 discloses laminates of spunbonded and meltblown nonwovens including a suggestion that such laminates may be useful for a wide variety of applications including outer wear linings, jackets, rainwear, pillow cases, sleeping and slumber bags and liners. The patent further suggests that water repellency and air permeability are attained and that pigments may be added for desired color effects. However, the patent does not disclose treatments for flame retardancy and ultraviolet radiation degradation resistance. U.S. Pat. No. 4,196,245 to Kitson et al. dated Apr. 1, 1980 also discloses laminates of spunbonded and meltblown nonwovens having liquid strike-through resistance and air permeability. U.S. Pat. No. 3,932,682 to Loft et al. dated Jan. 13, 1976 describes recreational fabric material having a capability of transmitting air and moisture vapor and being waterproof made by spray spinning a filamentary polymer material onto open-celled polymer film or noncellular elastic polymer film having been stretched and heat set. U.S. Pat. No. 4,217,386 to Arens et al. dated Aug. 12, 1980 describes laminates of meltblown and spunbonded webs with an activated carbon layer for garments to protect against toxic chemical vapors. U.S. Pat. No. 4,196,245 to Kitson et al. dated Apr. 1, 1980 describes a wide variety of laminates including at least two meltblown layers particularly useful for surgical applications. In addition, there are a great number of prior art patents describing processes for attaining one or more of the desired properties of flame retardancy, ultraviolet radiation degradation resistance, water repellency, and the like. Representative of these are U.S. Pat. No. 4,094,943 to Howarth et al. issued June 13, 1978, U.S. Pat. No. 3,955,028 to Weil issued May 4, 1976, U.S. Pat. No. 3,955,029 to Garner issued May 4, 1976, U.S. Pat. No. 4,035,542 to Rosenthal et al. issued July 12, 1977, U.S. Pat. No. 4,219,605 to Rohringer issued Aug. 26, 1980, U.S. Pat. No. 4,154,890 to Wagner issued May 15, 1979, U.S. Pat. No. 4,158,077 to Mischutin issued June 12, 1979, U.S. Pat. No. 4,178,408 to Franz et al. issued Dec. 11, 1979, U.S. Pat. No. 3,928,504 to Koelewijn issued Dec. 23, 1975, and U.S. Pat. No. 3,678,136 to Vandenberg issued July 18, 1972.

SUMMARY

The nonwoven recreational fabric of the present invention, in its most basic form, comprises a three layer laminate. The outer layers are spunbonded nonwovens, one of which is treated for resistance to ultraviolet radiation degradation and is intended for outside exposure. The other spunbonded layer is treated for flame retardance and ultraviolet degradation resistance. The middle layer is a meltblown nonwoven which may or may not contain a ultraviolet stabilizer and is preferably densified and contributes resistance to liquid strike-through. The resulting fabric, unexpectedly, has a combination of properties exhibiting a higher degree of flame retardance and resistance to ultraviolet light degradation than the individual treated components. Thus, instead of these treatments adversely affecting each other as had been prior experience, they cooperate in a positive manner to produce a fabric having improved properties.

The combination preferably includes pigments for coloring the spunbonded webs and may include additional layers of either spunbonded or meltblown materials depending upon the desired physical properties. Bonding of the laminate is preferably achieved in a pattern to retain flexible, fabric-like feel and hand. For example, heat and pressure in a patterned nip may be applied, or ultrasonic spot welding may be employed. The resulting fabrics are highly useful as tent material and for other recreational applications including outerwear, tarpaulins, and the like.

DESCRIPTION OF THE PREFERRED EMBODIMENTS

Figure 1:
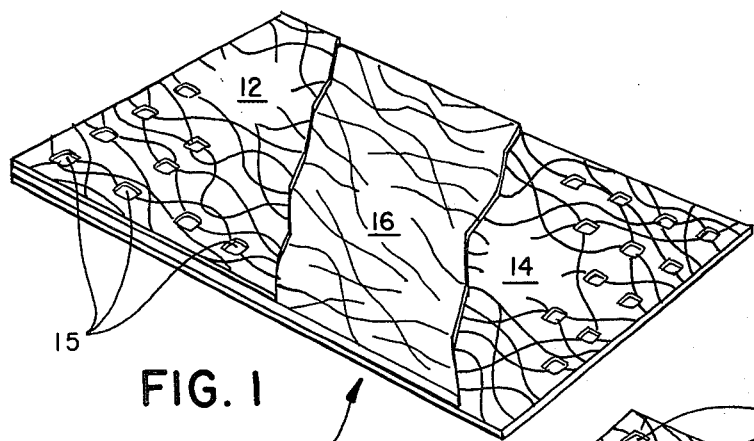
FIG. 1 is a schematic perspective view of a three layer nonwoven fabric of the present invention shown partially broken away.

While the invention will be described in connection with preferred embodiments, it will be understood that it is not intended to limit the invention to those embodiments. On the contrary, it is intended to cover all alternatives, modifications and equivalents as may be included within the spirit and scope of the invention as defined by the appended claims.

In describing the nonwoven fabrics of the present invention and their properties, reference to certain tests will be made. These tests are described as follows:

Trapezoidal Tear

Federal Test Method Standard No. 191B Method 5136 was employed with the exceptions that, the face of the jaws measured 1 inch by 3 or more inches, the distance between clamps was 1 inch at the start of the test, and all machine attachments for determining maximum loads were disengaged during testing. A sample 3 inches by 6 inches was used and a cut of about ⅜ inch made in the center of a perpendicular to the shorter base of an isosceles trapezoid having an altitude of 3 inches and bases of 1 and 4 inches marked on the sample.

Water Repellency

Federal Test Method Standard No. 191B Method 5514 was employed using an inverted conical well equipped to introduce water at 26.7° C. above the sample over a circular area of 4.50±0.05 inches in diameter at a rate of 1±0.1 centimeters of hydrostatic head per second.

The sample was clamped over the inverted conical well orifice and water introduced with the air vented. The hydrostatic head was measured to the nearest centimeter at the appearance of a drop or drops of water at three different locations and the average of five readings reported.

Elmendorf Tearing Resistance

Federal Test Method Standard No. 191B Method 5132 was employed using a pendulum machine wherein a 2½ by 4 inch specimen was held between a pair of clamps, one movable and one stationary and torn by the fall of a pendulum through the force of gravity. A circumferential graduated scale indicated the force used in tearing the specimen. The sample is clamped with the long dimension parallel to the machine direction for machine direction tests and parallel to the cross direction for cross direction tests.

A slit was formed in the specimen midway between the clamps extending from the bottom edge of the specimen to a point 0.157 inch above the top edge of the clamps leaving a distance of 1.692 inches of un-cut specimen perpendicular to the long dimension of the specimen. With the pendulum in the raised position the moveable clamp lies in the same plane as the fixed clamp forming an extension of the fixed clamp. When the pendulum fell, the pendulum clamp moved away from the fixed clamp tearing the specimen. The force required to tear was read from a scale to the nearest division. Five tests were made and the results averaged.

Flame Resistance of Cloth; Vertical

Federal Test Method Standard No. 191B Method 5903 using a rectangular specimen 2¾ inches by 12 inches. All samples were brought to moisture equilibrium under standard atmospheric conditions and exposed to a test flame within 20 seconds after removal. The sample was suspended vertically so that the entire length of the specimen was exposed and the lower end ¾ inch above the top of the gas burner. Prior to inserting the specimen the pilot flame was adjusted to approximately ⅛ inch in height from its fullest point to the tip.

The burner flame was adjusted by means of a needle valve to give a flame height of 1½ inches with the stop cock fully open and the air supply shut off and taped. After inserting the specimen, the stop cock was fully opended and the burner flame applied vertically at the middle of the lower edge of the specimen for 12 seconds and the burner turned off. The after-flame time was recorded as the time the specimen continued to flame after the burner flame was shut off. The after-glow time was the time the specimen continued to glow after it had ceased to flame.

Water Vapor Permeability

This test was determined in accordance with Federal Test Method Standard No. 406 dated Oct. 5, 1961, identified as Method 7032.

Permeability to Air; Cloth, Calibrated Orifice Method

This method was conducted in accordance with Federal Test Standard No. 191B Method 5450 dated Dec. 31, 1968 and used a square sample having a minimum of 7 inches by 7 inches.

Turning to FIG. 1, the nonwoven fabric laminates of the present invention will be described in further detail. As illustrated, laminate 10 comprises spunbonded layers 12 and 14 on either side of meltblown layer 16. Spunbonded layer 10 is preferably formed with spotbonds 15 in accordance with the process described in U.S. Pat. No. 3,855,046 to Hansen et al. issued Dec. 17, 1974, incorporated herein by reference. The basis weight of this component is preferably in the range of from about 0.5 to 5 oz/yd$^2$ with the range of 1 to 3.5 oz/yd$^2$ being most preferred. As will be recognized by those skilled in the art, ultraviolet radiation resistance to degradation may be obtained in such spunbonded webs by a number of means. For example, the webs may be coated with an agent for that purpose, or the agent may be incorporated into the polymer prior to extrusion. For purposes of this invention, it is preferred that the latter method be utilized and that an agent selected from the group consisting of nickel chelates such as nickel (2,2' thiobis (4 tertiary octyl) phenolato) normal butylamino, and bis (2,2' thiobis-4-(tertiaryoctyl) phenolato) nickel or the group consisting of hindered amines be employed. Use of this agent in an amount in the range of from about 0.25 to 2.0% based on the weight of polymer is preferred.

Spunbonded layer 14 is preferably similarly prepared except that a flame retardancy agent is employed in addition to the agent designed to provide ultraviolet radiation degradation resistance. Such flame retardancy agents are also known and may be added by coating, impregnating, or in the polymer prior to extrusion. The latter step is also preferred using an agent such as aromatic bromine compounds in combination with antimony trioxide or pentavalent antimony oxide in an amount of up to about 2–20% by weight of polymer.

Meltblown layer 16 is preferably formed in accordance with the disclosure of U.S. Pat. No. 3,676,242 to Prentice issued July 11, 1972 or such as described in an article entitled "Superfine Thermoplastic Fibers," appearing in Industrial Engineering Chemistry, Vol. 48, No. 8, pages 1342 to 1346 which describes work done at the Naval Research Laboratories in Washington, D.C. Also see Naval Research Laboratory Report 11437, dated Apr. 15, 1954. Preferably this component has a basis weight in the range of from about 0.5 to 2.0 oz/yd$^2$ and especially 0.5 to 1.25 oz/yd$^2$. Such materials are highly advantageous in providing resistance to liquid strike-through while allowing the passage of water vapor and air. The stability of this meltblown component can be improved by the utilization of ultraviolet degradation stabilizers as in the case of the spunbond components.

Any or all of the component layers may be colored by the addition of pigments to the polymer prior to extrusion. Preferably the outer layers are colored differently so as to distinguish easily between the treatments applied for resistance to ultraviolet light radiation degradation and fire retardancy. The total basis weight of the combination is preferably in the range of from about 2.5 to 10.0 oz/yd$^2$ for most recreational fabric applications and especially in the range of from about 3.0 to 8.0 oz/yd$^2$ for applications such as tent material.

While a number of synthetic thermoplastic polymers may be employed in forming the component layers of the present invention, for improved bonding of the laminate, it is preferred that the same polymer be employed in each of the component layers or, at least, polymers having similar melting points. Especially preferred is polypropylene, but other synthetic thermoplastic polymers such as polyethylene, polyester, nylon, and the like may be employed as well. However, as is known, selection of a specific polymer may dictate changes in the selected treatment agents as well as bonding conditions for the laminate. These changes, however, will be apparent to those skilled in the art familiar with the manufacture of nonwovens from such polymers.

Figure 2:
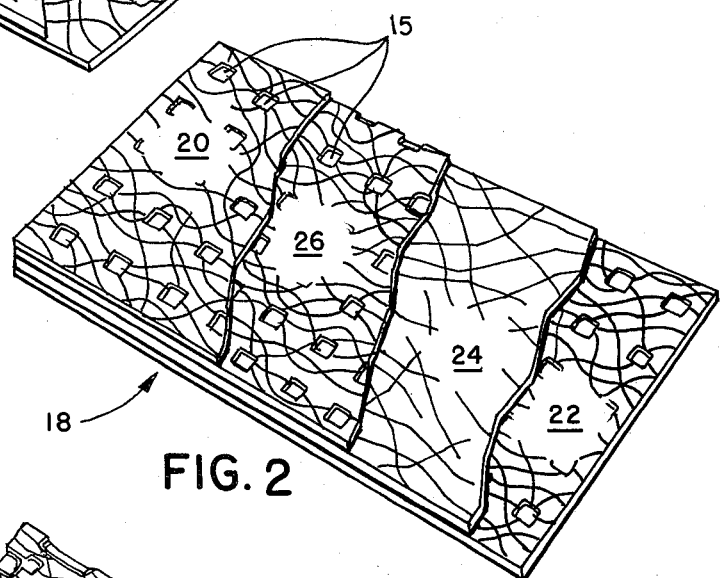
FIG. 2 is a similar view of an alternative embodiment employing more than three layers.

As shown in FIG. 2, additional component layers may be employed for the purpose of obtaining specific properties such as increased strength or the like. As illustrated, nonwoven fabric 18 includes spunbonded layers 20 and 22 on the exposed surfaces as well as meltblown layer 24 and the additional spunbonded layer 26 as intermediate layers. In this case, spunbonded layer 26 need not be treated and provides additional supporting strength for the laminate intended for heavy duty applications such as tarpaulins and the like.

Figure 3:
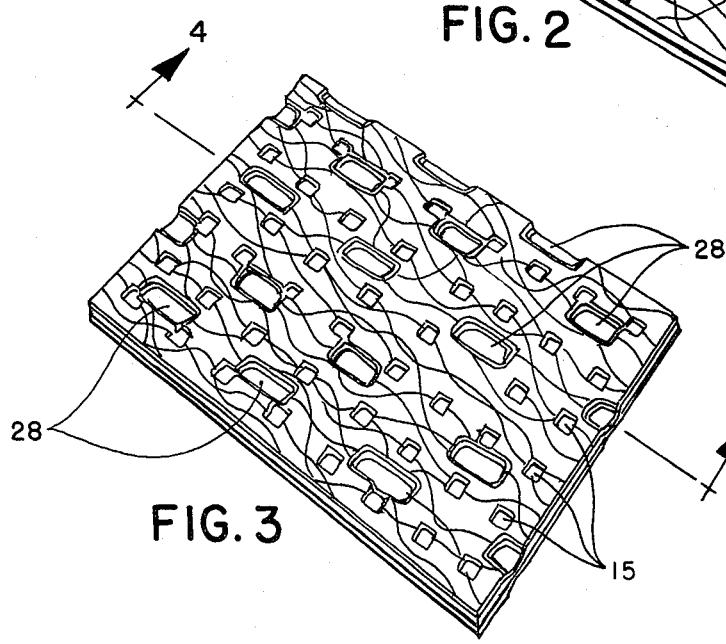
FIG. 3 is a perspective view of the fabric of FIG. 1 illustrating a representative pattern bond configuration.

FIG. 3 illustrates a pattern bonded three component fabric of the present invention that has been pattern bonded by means of heat and pressure. The pattern bonding 28 preferably occupies an area of 5 to 20% of the surface and incorporates a bond density of about 10 to 40 pins/in$^2$.

Figure 4:
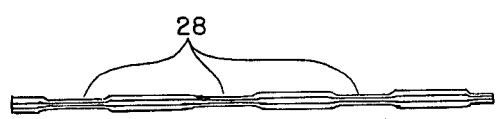
FIG. 4 is a cross-section of the web of FIG. 2 taken along lines 4—4.

FIG. 4 is a cross-section at lines 4—4.

Figure 5:
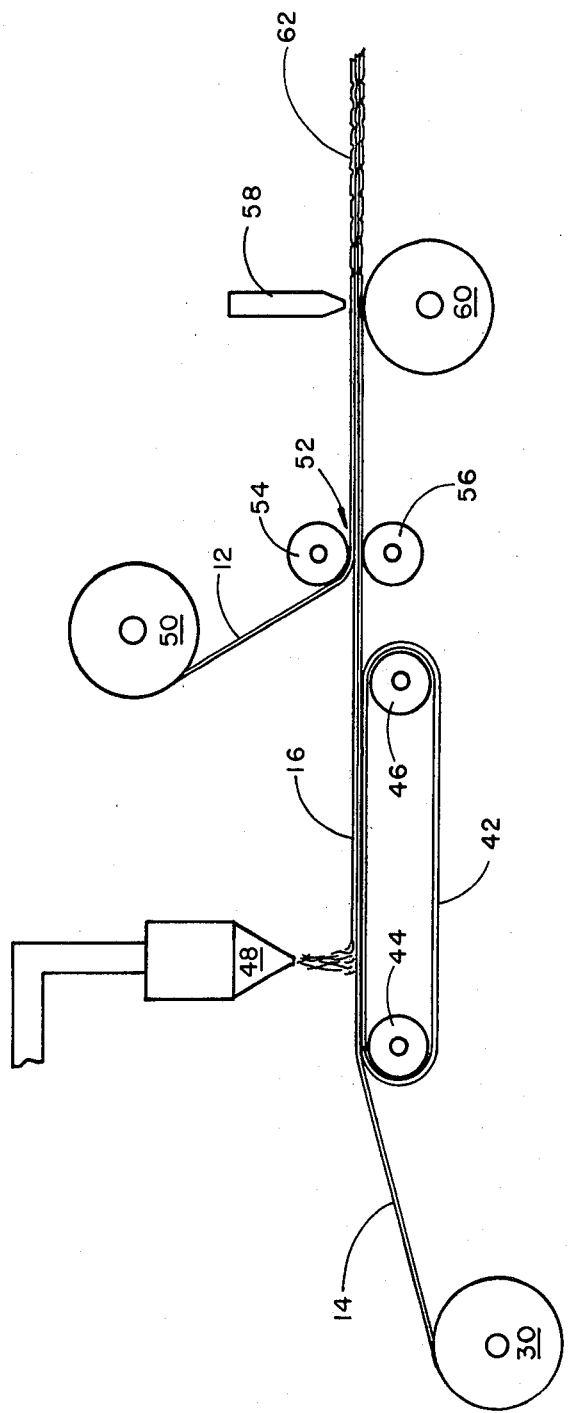
FIG. 5 is a schematic illustration of a method of making the fabrics of the present invention.

Turning to FIG. 5, a method of forming the combination of FIG. 3 will be described. Spunbonded web 14 is unwound from supply roll 30 onto support belt 42 driven about rolls 44, 46. Meltblown web 16 is formed directly onto web 14 by die 48. A second spunbonded web 12 is unwound from parent roll 50, and the three layers directed through combining nip 52 between rolls 54, 56. The combination is pattern bonded by passing between sonic horn 58 and anvil roll 60 into fabric 62.

The invention will now be further described in terms of specific examples demonstrating the range and improved properties obtained.

EXAMPLE 1

A spunbonded component layer was formed in accordance with the process described in aforementioned Hansen et al. U.S. Pat. No. 3,855,046. Specifically, polypropylene having a melt flow at 230° C. generally in the range of from 30 to 40 g/10 min. (available from Hercules under the trademark Profax) was extruded at a rate of 0.9 g/min. and at a temperature of about 230° C. and drawn to form continuous filaments having an average diameter of about 15 microns. These filaments were collected on a support into an entangled web having a basis weight of 2 oz/yd$^2$. Prior to extrusion Cyasorb 1084 (2,2' Thiobis (4-t-octyl phenolato)-n-butyl amine Nickel II from American Cyanamid) and Tinuvin 328 (benzotriazote type ultroviolet stabilizer were added to the polymer in an amount of 0.75% each based on polymer weight for ultraviolet radiation resistance, and a fiber grade pigment dispersion was added to the polymer in an amount of 4% based on polymer weight for color. The mixture was blended until thoroughly mixed at room temperature in a tumble mixer. This component layer was pattern bonded by passing through a nip between a patterned steel roll and a smooth anvil roll at a temperature of 310° F. and pressure of 400 p.l.i. This resulted in 107 bonds per square inch and individual diamond shaped bond areas of 14.5% overall coverage.

A second spunbonded component layer having a basis weight of 2 oz/yd$^2$ was formed in the same manner except that, prior to extrusion, decabromodiphenyl oxide/antimony trioxide, 3:1 ratio mixture was added to the composition as a flame retardant in the amount of 8% by weight based on the polymer.

A meltblown component layer was formed in accordance with U.S. Pat. No. 3,676,242 to Prentice. Specifically, polypropylene having a melt flow at 230° C. in the range of from 30 to 40 g/10 min (available from Hercules under the trademark Profax) was meltblown at a rate of 3.3 lbs/inch/hour into discontinuous filaments having an average diameter of about 1.5 microns. These filaments were collected on a support into an entangled web having a basis weight of 1.0 oz/yd$^2$.

The three component layers were combined by passing between a sonic horn and an anvil. The resulting combination was overall pattern bonded as illustrated schematically in FIG. 6. The combination was subjected to tests as shown in Table I. For comparative purposes conventional recreational fabrics were also tested.

EXAMPLE 2

Example 1 was repeated except that the basis weight of the component layers was as follows: first spunbonded layer 3 oz/yd$^2$, second spunbonded layer 3 oz/yd$^2$, and meltblown layer 1 oz/yd$^2$ for a combined basis weight of 7 oz/yd$^2$.

EXAMPLE 3

Example 1 was repeated except that 0.75% by weight of a ultraviolet stabilizer (available from American Cyanamid under the trademark Cyasorb 2908) was added to the meltblown polymer prior to extrusion for ultraviolet light resistance.

TABLE I

Physical Tests

| Test Sample | Basis Wt. oz/yd² | Elmendorf Tear (lbs) MD | Elmendorf Tear (lbs) XD | Trap. Tear (lbs) MD | Trap. Tear (lbs) XD | Hydro. Head (cm) | Air Perm. (cfm) | Moisture Vapor Trans. (g/m²/24 hrs) |
|---|---|---|---|---|---|---|---|---|
| Example 1 | 5 | 5 | 5 | 20 | 20 | 58 | 26 | 8000 |
| Example 2 | 4 | 4 | 4 | 18 | 18 | 55 | 28 | 8000 |
| Cotton Poplin | 7 | 2.5 | 2.9 | 10.0 | 4.3 | 26 | 3 | 4200 |
| 50/50 Polyester/Cotton | 5.5 | 1.8 | 3.0 | 2.9 | 3.9 | 26 | 0 | — |
| Polyester | 5.0 | 2.0 | 2.3 | 13.0 | 9.0 | 30 | 0 | 500 |

TABLE II

Exposure Tests

| Test Sample | Water Repellency Retained % After 120 Days* | Hydrostatic Head Retained Initial (cm) | Hydrostatic Head Retained 120 Days | Mildew Development Days* Exposure Initial | 30 | 60 | 90 | 120 | 150 |
|---|---|---|---|---|---|---|---|---|---|
| Example 1 | 40 | 50 | 20 | None | None | None | None | None | None |
| Example 3 | 98 | 51 | 50 | — | — | — | — | — | — |
| Cotton Poplin (7 oz/yd²) | — | — | — | None | None | None | Slight | Moderate | Heavy |

*South Florida Test Fence Exposure

As these tests demonstrate, recreational fabrics of the present invention have improved combinations of properties including physical properties and properties after exposure. Particularly when ultraviolet resistant meltblown webs are used, hydrostatic head retention upon ageing is highly improved. When compared to conventional fabrics combinations of such properties are highly beneficial.

As the above examples demonstrate, the nonwoven fabric of the present invention provides a combination having highly improved properties when compared with the individual component. Thus, instead of providing counteracting treatments, the multi-component fabrics enhance the properties of the individual components and provide an improved overall result. Such fabrics are highly useful, especially for recreational fabric applications including tents, outer wear, tarpaulins and the like.

Thus, it is apparent that there has been provided, in accordance with the invention a nonwoven fabric laminate that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. A pattern bonded nonwoven fabric having a basis weight in the range of from about 2.5 to 10 oz/yd² with permeability, water repellency and flame retardant properties comprising,
   a multi-layer structure of thermoplastic polymer nonwoven fabrics including continuous filament outer layers having a basis weight of about 0.5 to 5 oz/yd² each, and a microfibrous intermediate layer having a basis weight of about 0.5 to 2.0 oz/yd²,
   wherein the melting points of the thermoplastic polymers used for each layer are similar and wherein the properties of the fabric result from forming or treating the component layers prior to combination including imparting ultraviolet light radiation resistance to one outer layer and flame retardancy to the other outer layer.

2. The fabric of claim 1 wherein the fabric basis weight is in the range of from about 3.0 to 8.0 oz/yd² and said continuous filament and microfiber thermoplastic polymers are polypropylene and said continuous filament layers are each spunbonded with a basis weight in the range of from about 1 to 3.5 oz/yd² and said microfiber layer is meltblown with a basis weight in the range of from about 0.5 to 1.25 oz/yd².

3. The fabric of claim 2 wherein said treatment for flame retardency is by addition of 2 to 20% by weight of a composition comprising aromatic bromine compounds in combination with antimony trioxide or penetavalent antimony oxide and said treatment for ultraviolet light radiation resistance is by addition of 0.25 to 2.0% by weight of an agent selected from the group consisting of benzotriazote and 2,2'-Thiobis(4-t-octyl phenolato)-n-butyl amine Nickel II.

4. The fabric of claim 3 including an additional spunbonded polypropylene inner layer as a strength member.

5. The fabric of claim 3 wherein the layers are united by a patterned application of ultrasonic energy, said pattern occupying 5 to 20% of the fabric surface with a bond density of about 10 to 40 bonds per square inch.

6. The fabric of claim 3 wherein the meltblown component layer is also treated for ultraviolet light radiation resistance by addition of 0.25 to 2.0% by weight of an agent selected from the group consisting of benzotriazote and 2,2'-Thiobis(4-t-octyl phenolato)-n-butyl amine Nickel II.

7. The fabric of claim 3 wherein pigment is added to color at least one of the component layers.

8. The fabric of claim 6 wherein the other external spunbonded layer containing the flame retardant also is treated for ultraviolet light radiation resistance by addition of 0.25 to 2.0% by weight of an agent selected from the group consisting of benxzotriazote and 2,2'-Thiobis'(4-t-octyl phenolato)-n-butyl amine Nickel II.

* * * * *